United States Patent [19]

Bailey

[11] Patent Number: 5,442,243

[45] Date of Patent: Aug. 15, 1995

[54] ELECTRICAL KEY AND LOCK SYSTEM

[75] Inventor: Henry C. Bailey, Castle Rock, Colo.

[73] Assignee: Electro Lock, Inc., Denver, Colo.

[21] Appl. No.: 18,037

[22] Filed: Feb. 16, 1993

[51] Int. Cl.6 .................................. B60R 25/04
[52] U.S. Cl. ................................... 307/10.5
[58] Field of Search .............. 307/10.2, 10.3, 10.4, 307/10.5; 70/237, 238, 402, 405, DIG. 46; 361/171, 172

[56] References Cited

U.S. PATENT DOCUMENTS

| Re. 27,013 | 12/1970 | Hedin et al. | 361/172 |
|---|---|---|---|
| D. 322,386 | 12/1991 | Bailey . | |
| 3,004,170 | 10/1961 | Greenspan | 307/10.5 |
| 3,673,467 | 6/1972 | Eisenreich | 361/172 |
| 3,846,640 | 11/1974 | Mihlhauser . | |
| 3,876,884 | 4/1975 | Housman et al. | 307/10.5 |
| 3,902,075 | 8/1975 | Oros | 307/10.5 |
| 4,151,508 | 4/1979 | Hensler et al. . | |
| 4,565,922 | 1/1986 | Anderson | 235/492 |
| 4,697,171 | 9/1987 | Suh . | |
| 4,945,872 | 8/1990 | Embry | 307/10.5 |
| 4,980,680 | 12/1990 | Knoll et al. . | |
| 4,993,627 | 2/1991 | Phelan et al. . | |
| 5,079,435 | 1/1992 | Tanaka . | |
| 5,133,426 | 7/1992 | Niriella et al. | 307/10.2 |

Primary Examiner—Todd De Boer
Assistant Examiner—Fritz M. Fleming
Attorney, Agent, or Firm—Mathews, Woodbridge & Collins

[57] ABSTRACT

A key and lock system is provided for enabling circuits of a vehicle. A key including a plurality of male contacts is inserted into a lock. Predetermined pairs of male contacts are connected to each other. A plurality of female contacts are arranged to receive the male contacts. Circuits of the automobile are connected to the female contacts. If a pair of male contacts is properly mated to a pair of female contacts circuits of the automobile are enabled. The lock can be reversed wire so that either side of the key can be inserted into the lock.

5 Claims, 8 Drawing Sheets

FIG. 11

ELECTRICAL KEY AND LOCK SYSTEM

BACKGROUND OF THE INVENTION

1. Field of the Invention

This invention relates to a key and lock system having particular application to an automotive ignition system.

2. Description of the Related Art

Conventional vehicle anti-theft systems include mechanical keys and electronic keys. In a mechanical key system, a mechanical key is inserted into an ignition starting lock. However, unauthorized duplication of keys is common. For example, it would be very easy to duplicate keys during a stay at a vehicle work shop. Thereafter, the duplicated key could be used to steal the vehicle. In an electronic key system, a lock is unlocked when an electric signal generated by the key coincides with an electric signal generated by the lock.

U.S. Pat. No. 4,993,627 describes an electronic lock security system with a coded key. A key receiver switch has a code sensing circuit for generating signals indicative of the key's code. A decision making circuit determines if the signal received is acceptable.

U.S. Pat. No. 5,079,435 describes a vehicle anti-theft system combining a mechanical key unit with an electronic key unit. If the electronic key unit becomes unable to operate, the mechanical key unit is used for unlocking the vehicle. The mechanical key unit requires entry of coded data or insertion of a mechanical key into a key switch provided in a poorly accessible part of the vehicle body. In this system, an authorized person can operate the motor vehicle even when the electronic key unit is unable to function normally without the risk of an unauthorized person operating the vehicle. The U.S. Pat. No. 5,079,435 has the disadvantage that the use of both a mechanical and electronic unit is cumbersome.

U.S. Pat. No. 3,846,640 describes an electrical combination key lock in which a card provided with a plurality of electrical contacts is inserted into an electric contact slot. A plurality of balls form the electrical contacts of the card. Circuits of the lock are completed in the contact slot if the balls are in the correct position, thereby activating the vehicle. If the balls are in an incorrect position, a warning system is activated. The U.S. Pat. No. 3,846,640 has the disadvantage that if the key is inserted in the wrong direction the electrical contacts will not match the circuits of the lock.

Of possible general relevance to the invention are U.S. Pat. Nos.: 4,697,171; 4,151,508; and 4,980,680.

Design Patent No. 322,387 issued to the inventor of this application illustrates the shape of an electrical key.

It would be advantageous to provide a motor vehicle security system that would make it difficult to start the vehicle by using an unauthorized key or tool for providing electrical contact. It would also be advantageous to provide a key that does not require electrical signals and can be inserted in either direction into the lock.

SUMMARY OF THE INVENTION

Briefly described, the invention comprises an apparatus for enabling circuits of a vehicle when a double-sided key having electrical contacts is inserted into a lock system.

A key includes a plurality of electrical male contacts at one end thereof. Predetermined contacts are connected to one another at the other end of the key in order to form connected pairs of contacts. A casing of the key covers the connected contacts. A lock system includes a plurality of electrical female contacts at one end thereof. Predetermined pairs of wires connect the female contacts to circuits of the automobile. A circuit is enabled when a pair of connected contacts of the key is properly mated to a predetermined pair of wires of the lock system. The electrical female contacts can be reversed wired so that a circuit is established when either side of the key is inserted into the lock.

DETAILED DESCRIPTION OF THE INVENTION

During the course of this description like numbers will be used to identify like elements according to the different figures which illustrate the invention.

Figure 1:
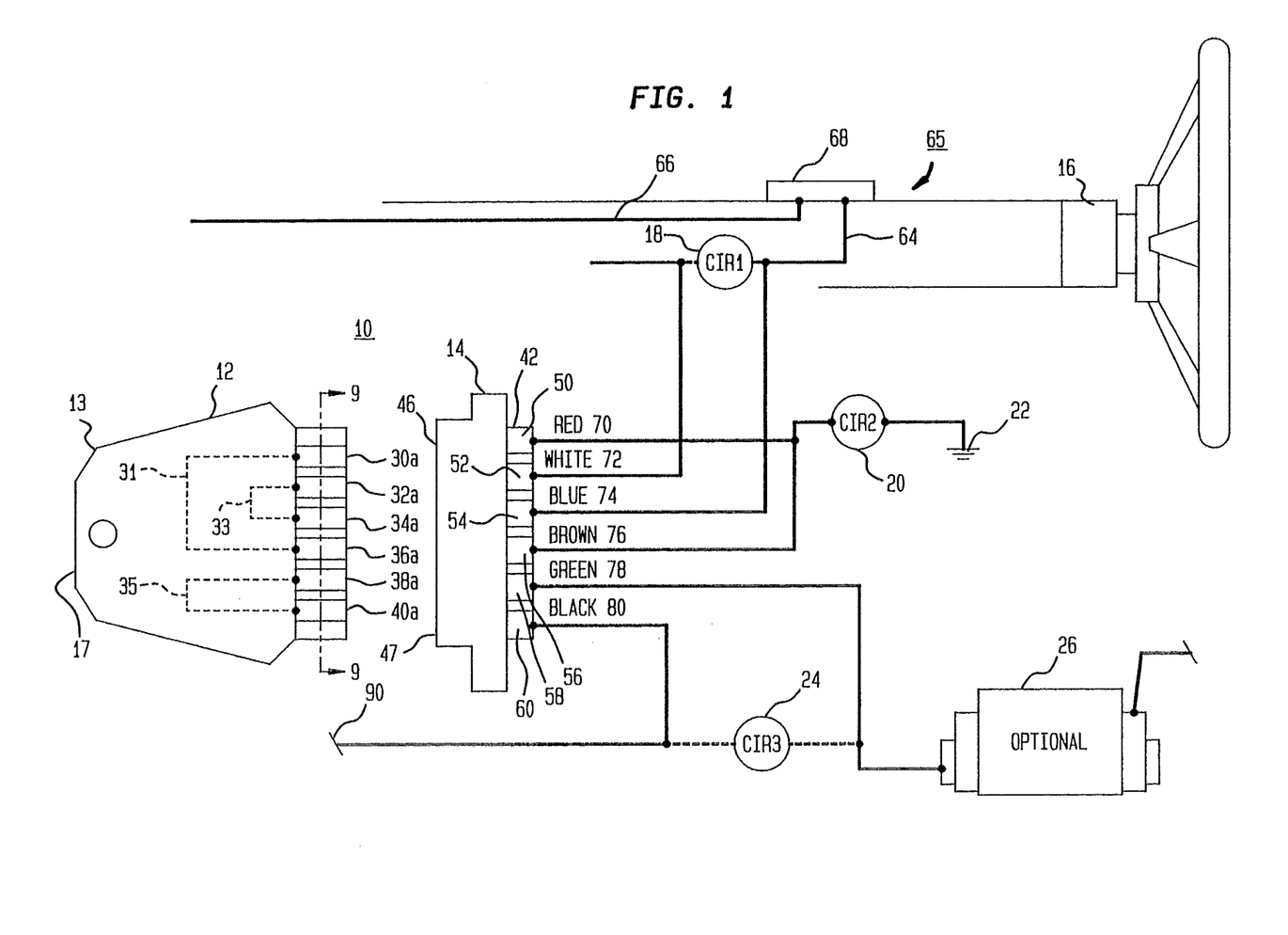
FIG. 1 is a schematic front view of a first configuration for a key and lock system in accordance with the present invention.

FIG. 1 is a schematic view of an electrical key and lock system 10 in accordance with the principals of the present invention. Electrical key and lock system 10 includes a key 12 and a lock 14. Male contacts 30a, 32a, 34a, 36a, 38a and 40a extend from one end of key 12. Male contacts 30a, 32a, 34a, 36a, 38a and 40a provide an electrical contact surface on either side of key 12. In this embodiment, electrical contacts 30a and 36a are connected to each other with wire 31. Electrical contacts 32a and 34a are connected to one another with wire 33 and electrical contacts 38a and 40a are connected to one another with wire 35. Accordingly, electrical contacts 30a and 36a, 32a and 34a, and 38a and 40a form three pairs of connected contacts.

Figure 2:
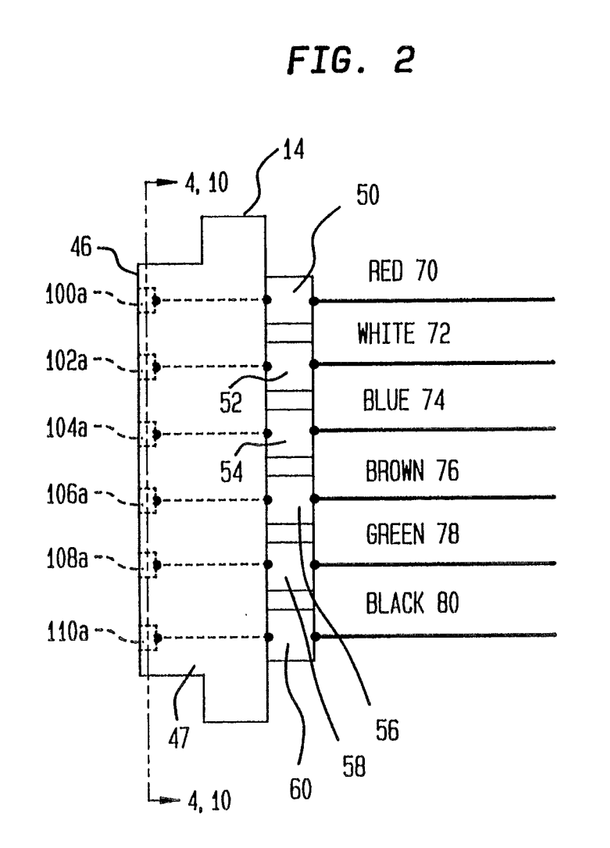
FIG. 2 is a front view of the lock shown in FIG. 1.
Figure 3:
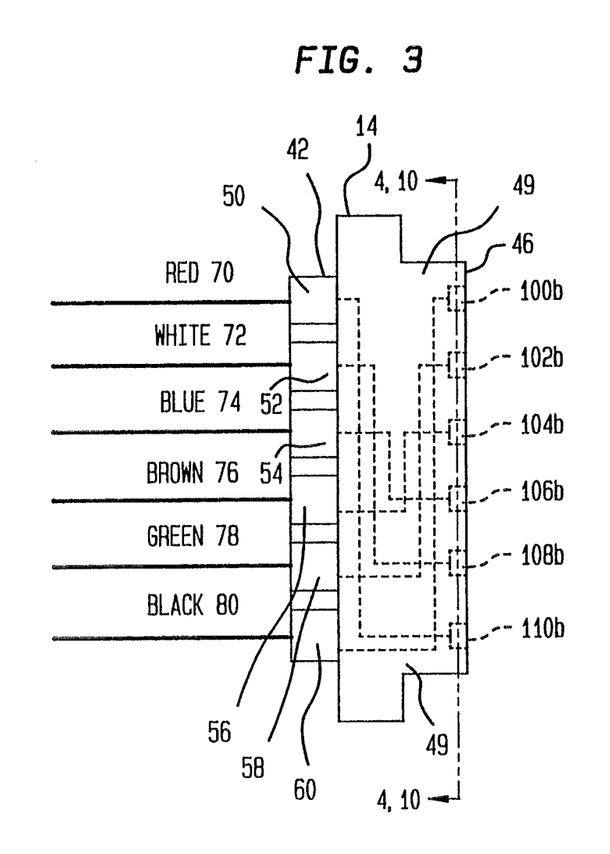
FIG. 3 is a rear view of the lock shown in FIG. 1.

Key 12 is inserted into end 46 of lock 14. End 46 includes female contacts 100a, 102a, 104a, 106a, 108a and 110a, as shown in FIG. 2. Female contacts 100a, 102a, 104a, 106a, 108a and 110a are wired to respective connectors 50, 52, 54, 56, 58 and 60 on front surface 47 of lock 14. FIG. 3 illustrates the rear surface of lock 14. On rear surface 49 of lock 14, female contact 100b is wired to connector 60, female contact 102b is wired to connector 58, female contact 104b is wired to connector 56, female contact 106b is wired to connector 54, female contact 108b is wired to connector 52 and female contact 110b is wired to connector 50 for providing reverse wiring of lock 14. Reverse wiring of lock 14 allows circuits to be established when either side of key 12 is inserted into lock 14.

Wires 70, 72, 74, 76, 78 and 80 extend from respective connectors 50, 52, 54, 56, 58, and 60. Wires 70, 72, 74, 76, 78 and 80 are respectively labeled red, white, blue, brown, green and black. It will be appreciated that any color combination can be used for the wires. Predetermined pairs of wires 70, 72, 74, 76, 78 and 80 are connected to CIR1 circuit 18, CIR2 circuit 20 and CIR3 circuit 24 of the vehicle.

Figure 4:
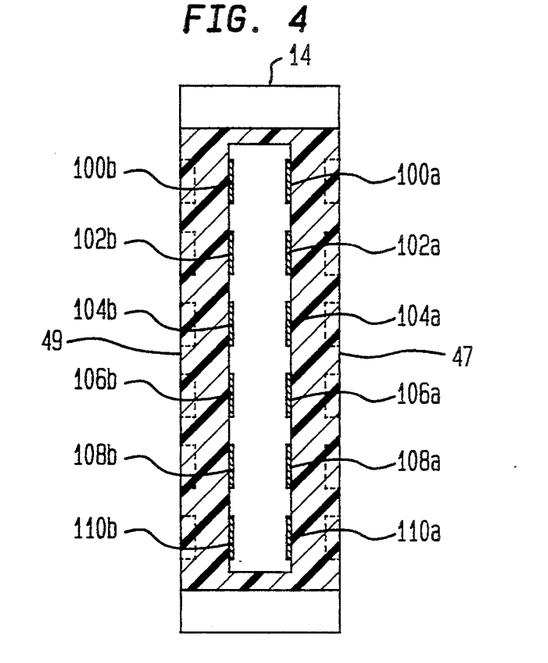
FIG. 4 is a top cross sectional view of the lock shown in FIG. 1.

FIG. 4 illustrates that female contacts each include pairs of contacts: 100a, 100b; 102a, 102b; 104a, 104b; 106a, 106b; 108a, 108b; and 110a, 110b. Each contact in the pair contacts an electrical male contact and receives half of the load when a circuit is established. Preferably, each contact in the pair receives 20 amperes. In this configuration, white and blue wires of lock 14 are connected to CIR1 circuit 18. Red and brown wires of lock 14 are connected to CIR2 circuit 20 and brown and green wires are connected to CIR3 circuit 24.

CIR1 circuit 18 establishes a connection with ignition system 65 of a vehicle. Ignition system 65 includes hot wire 66 and cold wire 64. Hot wire 66 is positioned in steering column 16 and is connected to ignition 68. During installation of key and lock system 10 cold wire 64 is cut and is connected to CIR1 circuit 18. After insertion of key 12 into lock 14 a circuit is established between male contacts 32a, 32b, 34a and 34b, white and blue wires and CIR1 circuit 18. A conventional ignition key is inserted into ignition 68 and hot wire 66 contacts cold wire 64 when the ignition key is turned to the start position and CIR1 circuit 18 is established for operation of the vehicle.

CIR2 circuit 20 is a ground circuit. After insertion of key 12 into lock 14 a circuit is established between male contacts 30a, 30b, 36a and 36b red and brown wires and CIR2 circuit 20. A ground circuit is used for preventing tampering of the lock by an unauthorized user. If an unauthorized user uses a tool or wire to provide electrical connection between a pair of female contacts and a connection between wires other than red and brown wires is established, a large amount of current, i.e., 100 amps is supplied to ignition system 65 in order to blow a starter fuse and render the vehicle inoperable.

CIR3 circuit 24 is an auxiliary circuit. CIR3 circuit 24 can be connected to an optional device 26 such as a fuel pump. A circuit is established between male contacts 38a, 38b, 40a and 40b, green and black wires, and CIR3 circuit 24. Optional device 26 will operate when CIR3 circuit 24 is established. CIR3 circuit 24 can also be connected to a neutral safety switch 90.

Figure 5:
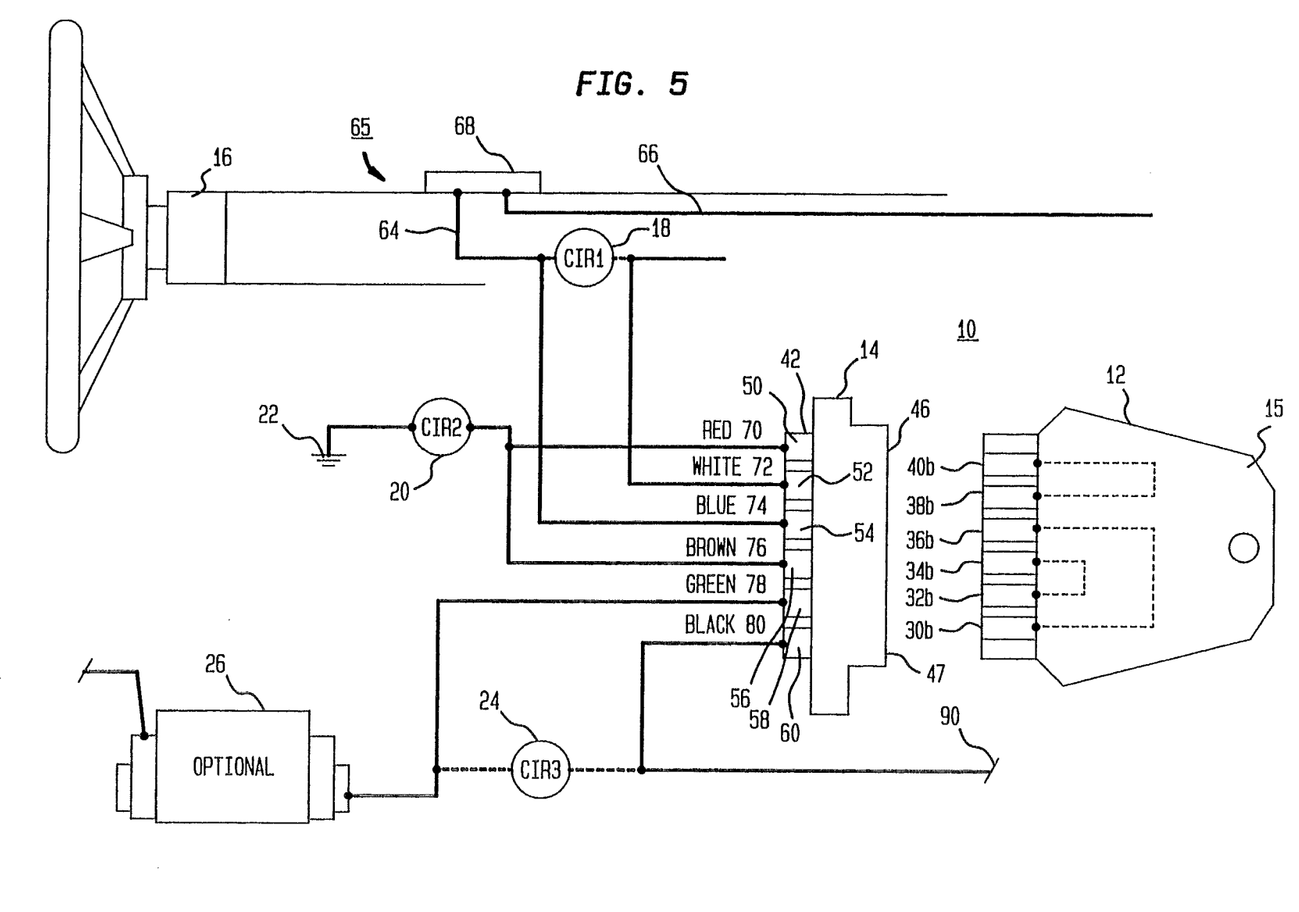
FIG. 5 is a schematic rear view of the key and lock system shown in FIG. 1.

Female contacts 100a, 102a, 104a, 106a, 108a and CIR1 and circuit 18 is established and 110a, b contact respective male contacts 30a, 32a, 34a, 36a, 38a and 40a when key 12 is inserted with front surface 13 of key 12 facing front surface 47 of lock 14, as shown in FIG. 1. Female contacts 100a, 102a, 104a, 106a, 108a and 110a contact respective male contacts 40b, 38b, 36b, 34b, 32b and 30b when key 12 is inserted with rear surface 15 of key 12 facing front surface 47 of lock 14, as shown in FIG. 5. Casing 17 covers wires 31, 33 and 35.

Figure 6:
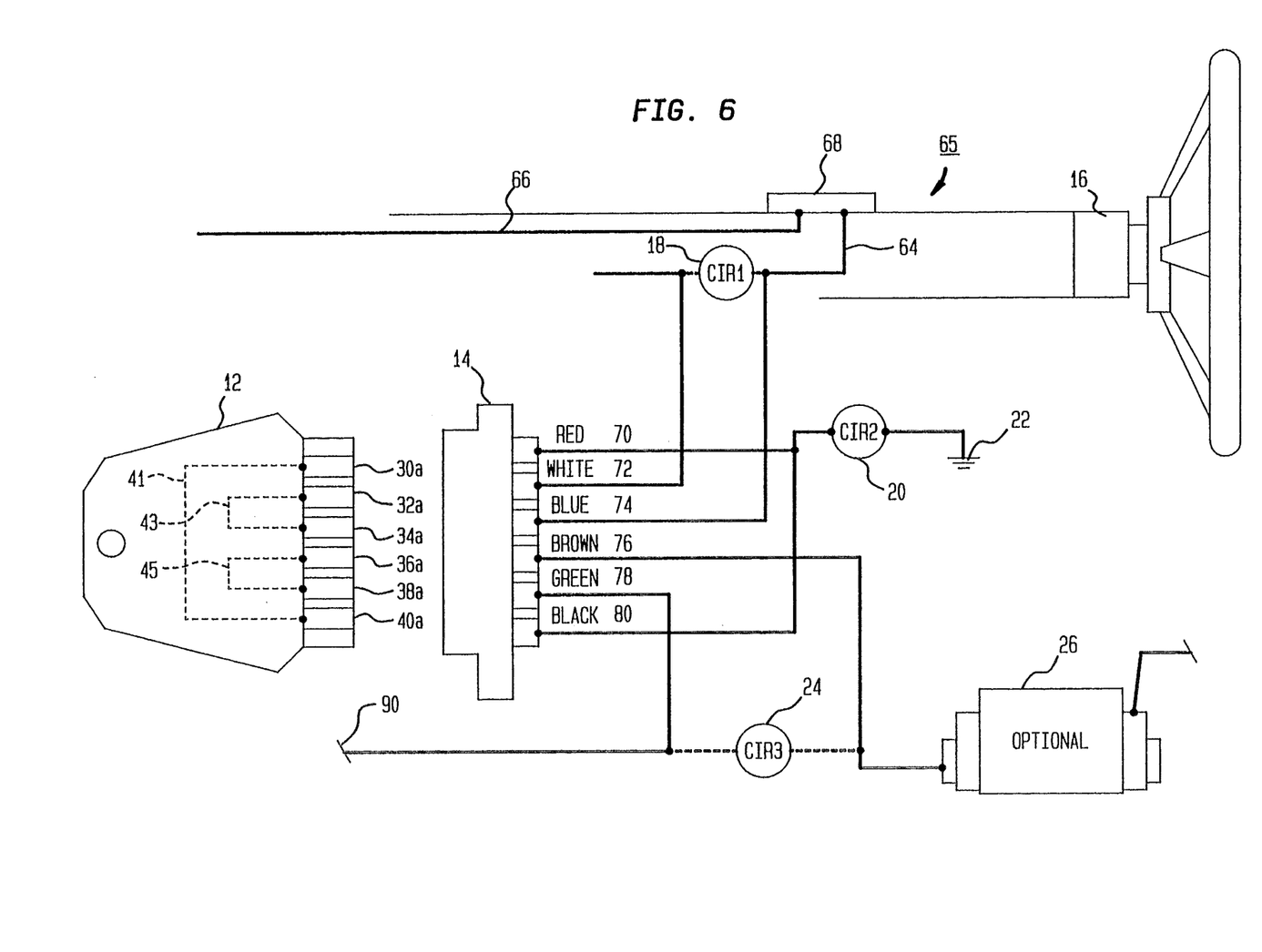
FIG. 6 is a schematic view of a second configuration for a key and lock system in accordance with the present invention.

FIG. 6 illustrates a second configuration in which male contacts 30a and 40a are connected with wire 41, male contacts 32a and 34a are connected with wire 43, and male contacts 36a and 38a are connected with wire 45 to form three pairs of connected contacts. In this configuration, white and blue wires are connected to CIR1 circuit 18, red and black wires are connected to CIR2 circuit 20, and brown and green wires are connected to CIR3 circuit 24.

Figure 7:
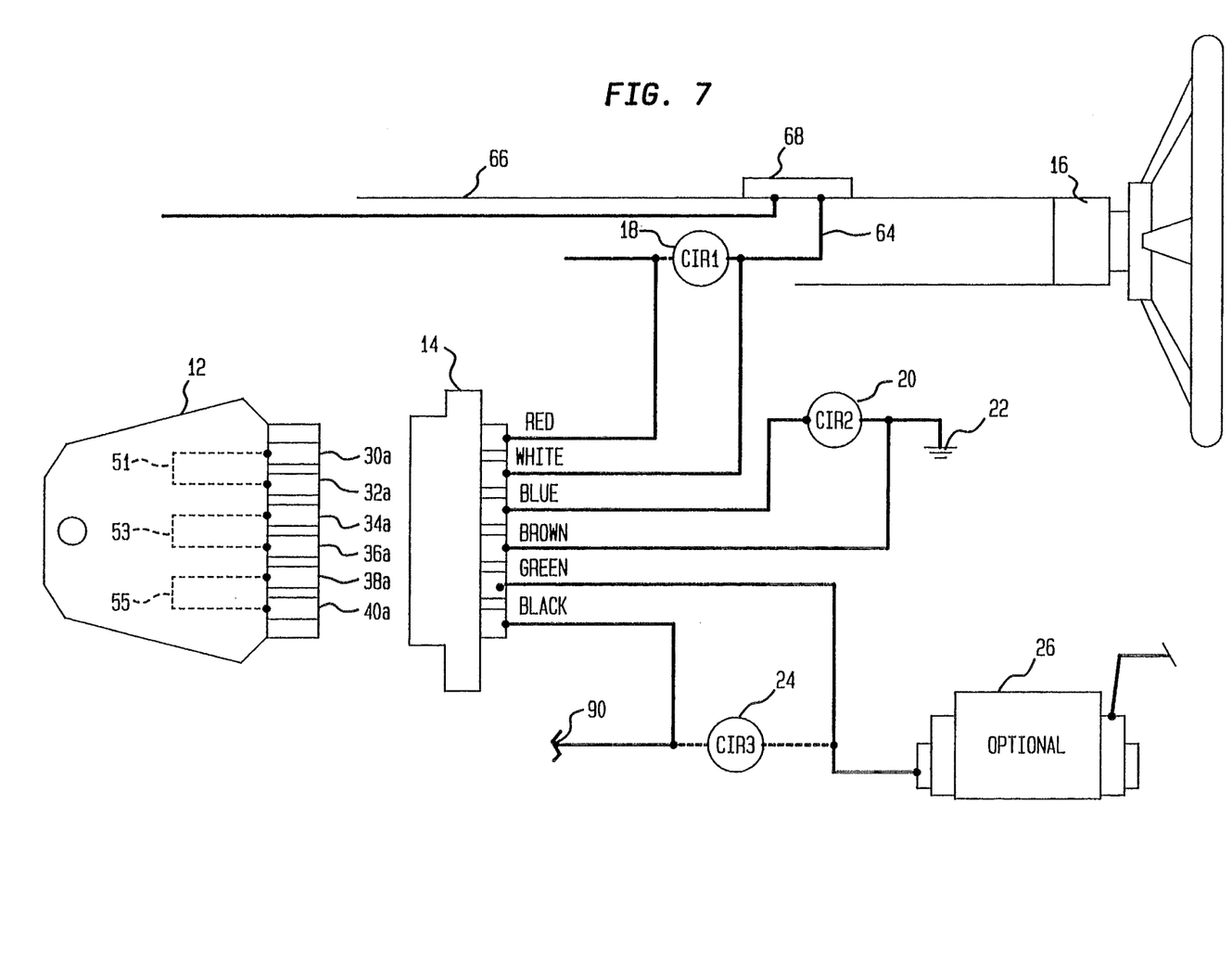
FIG. 7 is a schematic view of a third configuration for a key and lock system in accordance with the present invention.

FIG. 7 illustrates a third configuration in which male contacts 30a and 32a are connected with wire 51, male contacts 34a and 36a are connected with wire 53, and male contacts 38a and 40a are connected with wire 55. Red and white wires are connected to CIR1 circuit 18, blue and brown wires are connected to CIR2 circuit 20 and green and black wires are connected to CIR3 circuit 24.

Figure 8:
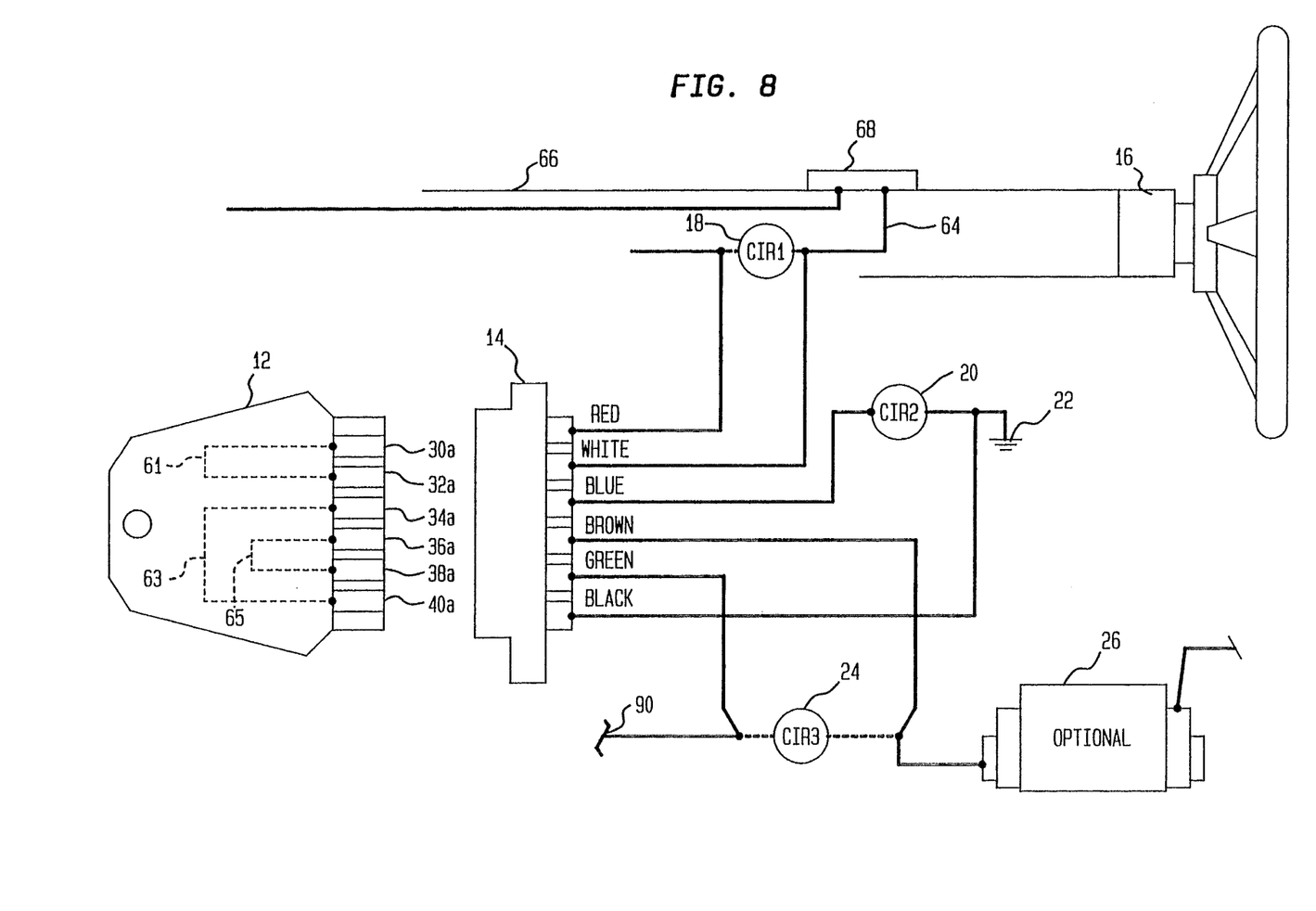
FIG. 8 is a schematic view of a fourth configuration for a key and lock system in accordance with the present invention.

FIG. 8 illustrates a fourth configuration in which male contacts 30a and 32a are connected with wire 61, male contacts 34a and 40a are connected with wire 63, and male contacts 36a and 38a are connected with wire 65. Red and white wires are connected to CIR1 circuit 18, blue and black wires are connected to CIR2 circuit 20 and brown and green wires are connected to CIR3 circuit 24. It will be appreciated that other configurations for connected pairs of male connectors could be used in accordance with the teachings of the present invention.

Figure 9:
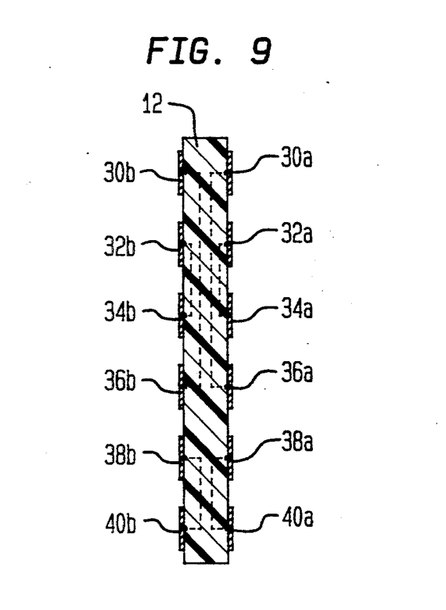
FIG. 9 is a cross sectional view of the key shown in FIG. 4.
Figure 10:
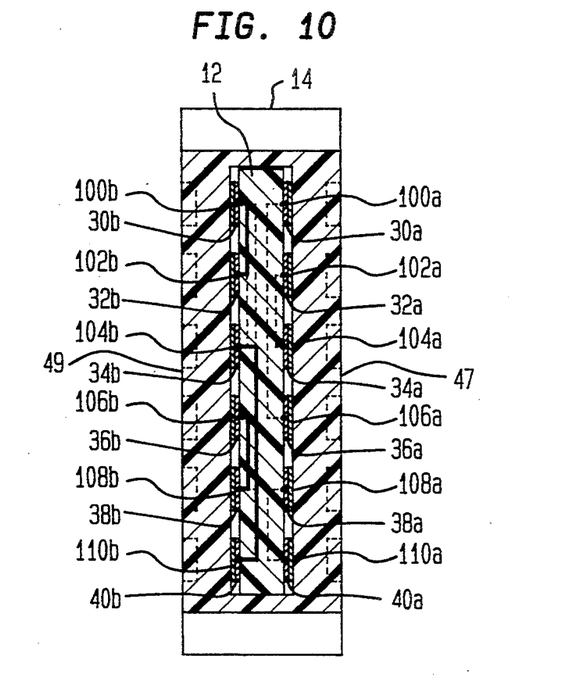
FIG. 10 is a cross sectional view of the key and lock combination.
Figure 11:
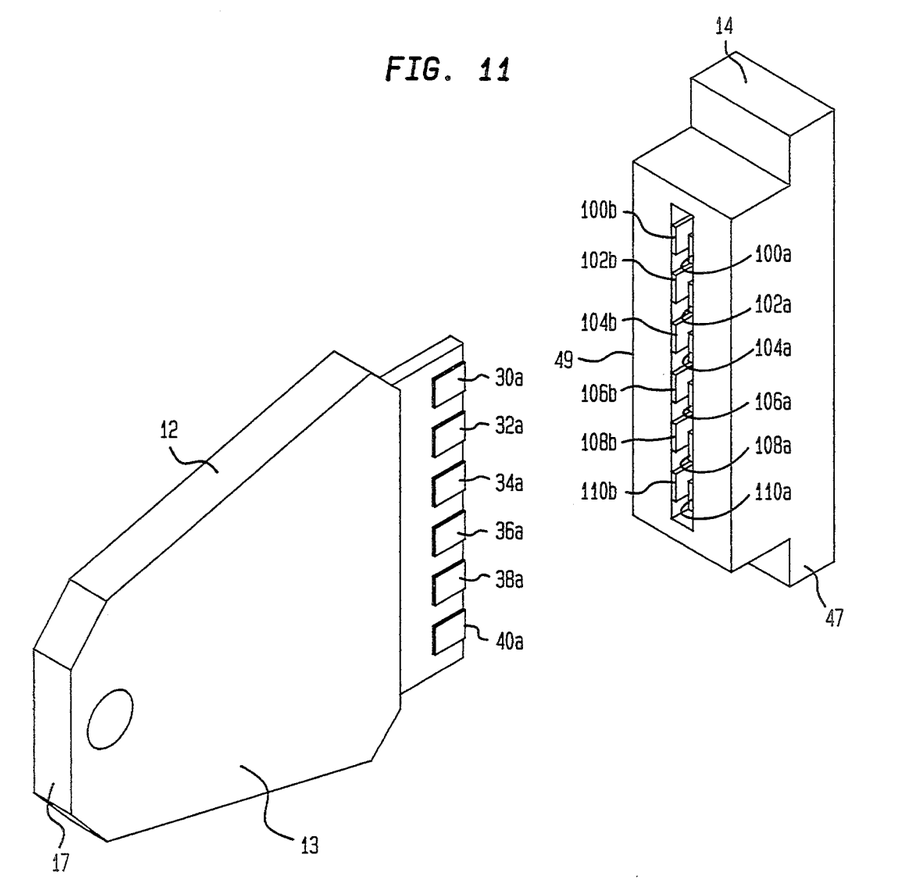
FIG. 11 is a perspective view of insertion of the key into the lock.

FIG. 9 is a cross sectional view of key 12 showing contacts 30a, 32a, 34a, 36a, 38a and 40a on the front surface 13 and contacts 30b, 32, 34b, 36b, 38b and 40b on the rear surface thereof. FIG. 10 is a cross sectional view of key 12 after insertion into lock 14. FIG. 11 is a perspective view of key 12 before insertion into lock 14.

The present invention has the advantage of preventing unauthorized use of a vehicle. Predetermined contacts of a lock are attached to at least one circuit of the vehicle. A key with a predetermined combination of connected contacts is inserted into the lock to mate with predetermined contacts of the lock for completing circuits. The lock provides a number of contacts to make it difficult for a thief to determine an operable combination. If an unauthorized user establishes a condition between inoperable combination of contacts, the vehicle will become inoperable. In addition, the key and lock system has the advantage that either side of the key can be inserted into the lock in order to allow easy use of the assembly by an authorized operator. The key and lock system provides an economical method for preventing theft of a vehicle.

While the invention has been described with reference to the preferred embodiment thereof, it will be appreciated by those of ordinary skill in the art that modifications can be made to the structure and form of the invention without departing from the spirit and scope thereof.

I claim:

1. A system for enabling at least one circuit of a vehicle comprising:
  a key having top and bottom surfaces;
  a plurality of pairs of electrical male contacts formed on said front surface of said key, a plurality of pairs of electrical male contacts formed on said rear surface of said key, both said pluralities of pairs of male contacts extending from one end of said key, a first connecting wire connecting a first male contact of said pair of male contacts on said front surface of said key to a second male contact of said pair of contacts on said front surface of said key, a second connecting wire connecting a first male contact of said pair of male contacts on said rear surface of said key to a second male contact of said pair of male contacts on the rear surface of said key, said first and second male contacts of said respective front and rear surfaces being aligned on said key, a lock connected to said at least one circuit of said vehicle, said lock including a plurality of pairs of electrical female contacts for establishing contact with said electrical male contacts, said lock having a front and rear surface;

each of said plurality of pairs of said electrical female contacts including a first female contact and a second female contact, said first female contact being positioned on said front surface of said lock and said second female contact being positioned on said rear surface of said lock, a first female contact positioned on said front surface of said lock of a first pair of said female contacts being wired to a second female contact positioned on the rear surface of said lock of a second pair of said female contacts for providing reversed wire pairs of said female contacts so that a predetermined pair of said plurality of male contacts mates with said reversed wired pairs of female contacts when either said front side or said rear side of said key is inserted adjacent said front surface of said lock, wherein a complete circuit connection of said at least one circuit is established when either said front or said rear surface of said key is inserted adjacent said front surface of said lock.

2. The system of claim 1 wherein a first and a second one of said reversed wired pairs of female contacts are connected to an ignition circuit and a first one of said plurality of pairs of male contacts mates with said first reversed wired pairs and a second one of said plurality of male contacts mates with said second one of said reversed wired pairs.

3. The system of claim 2 wherein a third and a fourth one of said reversed wired pairs of female contacts are connected to a ground circuit and a third one of said plurality of pairs of male contacts mates with said third one of said reversed wired pairs and a fourth one of said plurality of pairs of male mates with a fourth one of said reversed wired pairs.

4. The system of claim 3 wherein a fifth and a sixth one of said reversed wired pairs of female contacts are connected to an auxiliary circuit and a fifth one of said pairs of male mates with said fifth one of said reversed wired pairs and a sixth one of said plurality of pairs of male contacts mates with a sixth one of said reversed wired pairs.

5. The system of claim 4 wherein said connecting wires are covered by a casing.

* * * * *